UNITED STATES PATENT OFFICE.

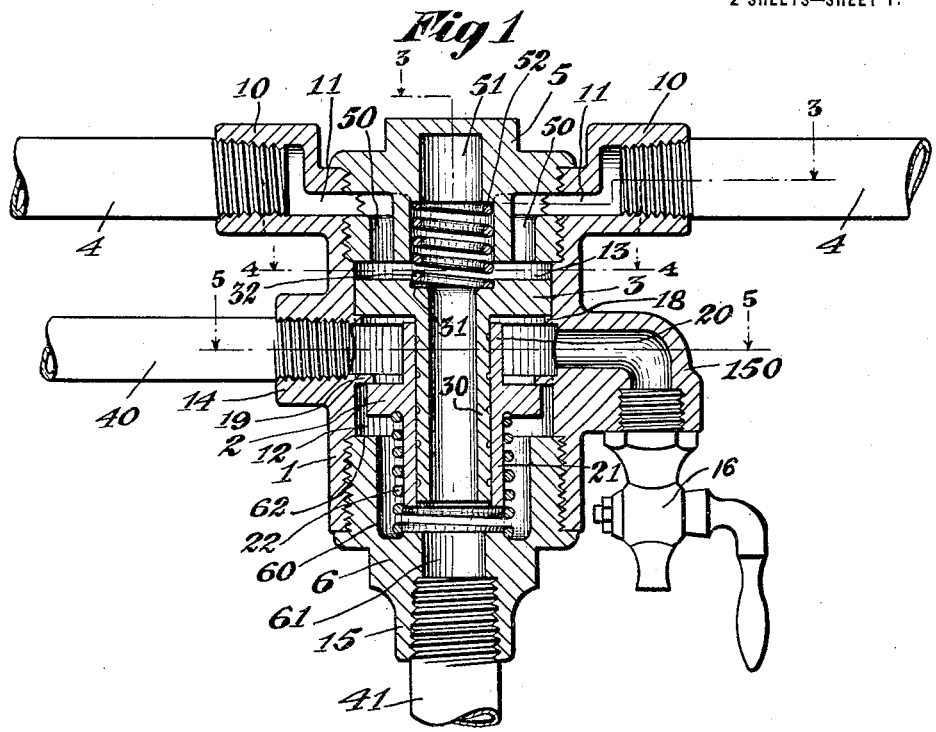

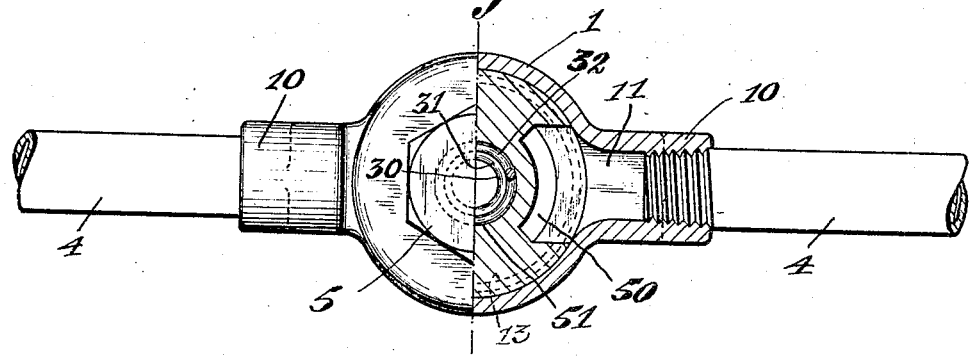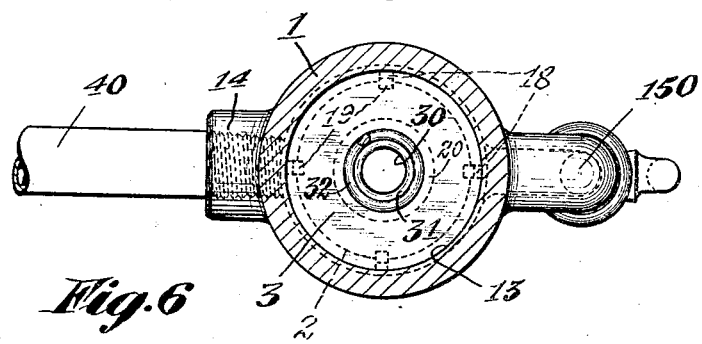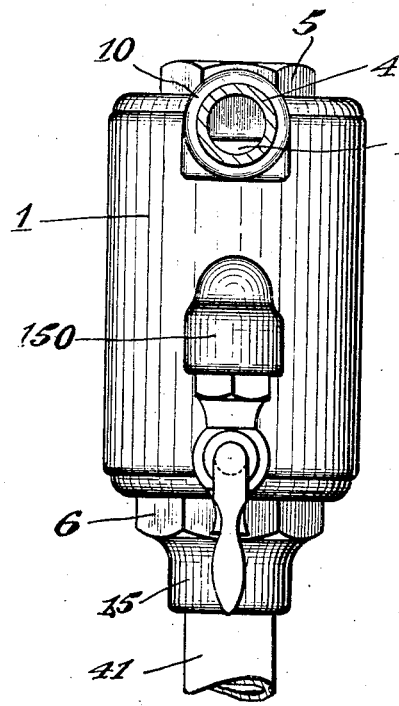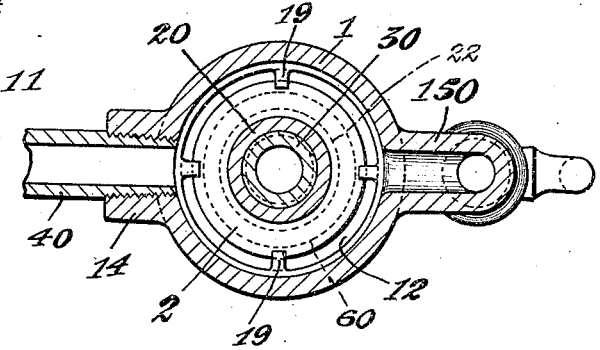

CHARLES W. NEWCOMBE, OF TACOMA, WASHINGTON.

AUTOMATIC DRAIN-VALVE.

1,236,745.  Specification of Letters Patent.  Patented Aug. 14, 1917.

Application filed February 2, 1916. Serial No. 75,854.

*To all whom it may concern:*

Be it known that I CHARLES W. NEWCOMBE, a citizen of the United States, and resident of the city of Tacoma, county of Pierce, State of Washington, have invented certain new and useful Improvements in Automatic Drain-Valves, of which the following is a specification.

My invention relates to automatic draining valves for pipes, cylinders and other spaces which contain steam.

The object of my invention is to improve upon prior devices intended for like use, and particularly in making the device fully automatic and so that it will not only drain the steam spaces with which it is connected, but will also drain itself.

The scope of my invention and the novel parts and combinations of parts which compose the same, may be seen by a study of the specification and the following description thereof, and by the claims by which it is more exactly defined.

The accompanying drawings show my invention in the form of construction which is now most preferred by me.

Figures 1 and 2 are central vertical sections on the same plane, Fig. 1 showing the parts in the position occupied when the steam pressure has been removed from the spaces with which the device is connected and Fig. 2 the position occupied when subjected to the steam pressure.

Fig. 3 is a section on the line 3, 3, of Fig. 1.
Fig. 4 is a section on the line 4, 4, of Fig. 1.
Fig. 5 is a section on the line 5, 5, of Fig. 1.
Fig. 6 is a side view of the device taken from the right hand side of Figs. 1 and 2.

The present invention is of the nature of a self contained device which is provided with means whereby it may be connected with any pipe or vessel which contains steam. The casing consists in the main of a cylindrical body 1, which has two piston receiving chambers 12 and 13, and provisions, as bosses 10, 10, and 14, for the attachment thereto of the pipes which connect it with the spaces to be drained and with a discharge.

The pipes 4, 4, connect with spaces to be drained, as, for instance, with opposite ends of an engine cylinder. These pipes connect with bosses 10 which connect with the interior of the casing by ports 11. The pipe 40 connects with a supply of steam which preferably is constant, as for instance with the steam supply pipe for the engine cylinder.

The upper end of the casing 1 is closed by a cap or plug 5 which screws into the casing. This plug is provided with ports 50 which are placed so as to register with ports 11 when the plug or cap 5 is seated. It is also provided with a central bore 51 which has a spring seating ledge 52.

The lower end of the casing is closed by a plug 6, which screws into the casing and has its outer or downwardly projecting boss 15 provided with an axial bore 61 communicating with the discharge pipe 41 and serving as the drainage channel. Pipe 41 serves to carry away the discharge.

In the upper end of the chamber existing in the casing between the end plugs 5 and 6, is a piston 3 which fits closely in the chamber. This piston has a depending stem 30 and piston and stem are axially bored to form a drainage discharge channel. The hollow stem 30 is not long enough to ever reach to the plug 6. Piston 3 may reciprocate between the lower surface of plug 5, with which it contacts to act as a valve to close parts 50, and stop lugs 18 which extend inwardly from the side walls.

A piston 2 is placed within the lower part of the chamber in the casing and has hollow trunk extensions, 20 and 21 at opposite sides, bored to make a steam tight sliding fit over the stem 30 of the other piston. Piston 2 has a loose fit in the casing so that steam and water may readily pass therebetween. Its upward movement is limited by contact with inward projections 19 from the wall of the casing. When depressed its inner surface may contact with the end surface 62 of plug 6 to act as a valve and close the discharge passage from the chamber to the pipe 41. A spring 32 which seats on the shoulder 52 of plug 5 and shoulder 31 of piston 3, will, when steam pressure is off, hold piston 3 away from plug 5, as shown in Fig. 1, thus making free drainage from pipes 4 to discharge pipe 41.

A spring 22 acting between plug 6 and piston 2, will hold this piston off of plug 6, when steam pressure is removed, thus making a free drainage channel from pipe 40 to pipe 41. The latter pipe being at the bottom of the casing, the device will have no pockets which are not thoroughly drained when the parts are in the position assumed when pressure is removed.

As a matter of convenience, to test the steam pressure and the working of the device and as a blowoff, a pet-cock 16 is connected through boss 150 with the space between the two pistons 2 and 3, or the space with which the pipe 40 connects. When the steam pressure is applied, the pressure between the pistons, being either more constant or higher than the pressure in pipes 4, the pistons will be forced outward and seated, the upper on plug 5 to close ports 50, and the lower on plug 6 to close the discharge from the central chamber, the parts assuming the position shown in Fig. 2. As soon as pressure is removed, the position shown in Fig. 1 will be assumed, in which position all the connected pipes and all spaces in the casing will drain. When in the position of Fig. 2, in which drainage channels are all nominally closed, there may, because of imperfect seating be leakage past the valve seating surface 62. It is therefore desirable that the sleeve 21 does not contact with the plug 6, thus leaving an outlet passage for such leakage.

What I claim as my invention is:

1. A drainage trap comprising a casing having drainage-receiving ports in one head, and a drainage discharging connection in the other, two pistons in the casing having telescopic engagement with each other and adapted to be seated one upon each head to close the openings therein, springs acting to force the pistons away from their respective heads, and a pressure supply connection with the casing between the pistons.

2. A drainage trap comprising a casing having drainage receiving and drainage discharging openings in opposite faces, two pistons having sliding engagement with each other and adapted to act as valves to each close an opening in respectively opposite sides of the casing, springs acting to unseat the pistons, and a pressure supply connection between the pistons.

3. A drainage trap comprising a casing having drainage receiving and drainage discharging openings in opposite faces, two pistons having sliding engagement with each other and adapted to act as valves each to close an opening in its respective side of the casing, springs acting to unseat the pistons, and a pressure supply connection between the pistons, the piston casing at the discharge side having a discharge port active when the piston is unseated.

4. A drainage trap comprising a casing having drainage receiving and drainage discharging openings in opposite faces, two pistons having sliding engagement with each other and adapted to act as valves to each close the openings each in its respective face of the casing, said pistons being axially bored, springs acting to unseat the pistons, and a pressure supply connection between the pistons.

5. A drainage trap comprising a casing having a piston chamber with its axis vertical, the upper head of this chamber having drainage receiving ports, the lower head a drainage discharge port and the central body a pressure supply connection, two pistons having telescoping stems, the upper fitting closely the piston chamber and adapted to seat upon the upper head to close the ports therein, the lower piston being constructed to permit free passage of the steam past its edges when unseated, its head of the casing having a seating surface for the piston surrounding the discharge opening, the stem of the upper piston being the innermost and being bored to form a discharge channel for the water from above the upper piston, and springs acting to unseat both pistons.

6. An automatic drainage trap having drainage receiving and drainage discharge ports, pistons actuated by fluid pressure to close said ports, springs acting upon the pistons to open said ports, each piston having, when unseated, a by pass formed by each piston and its adjacent part of the casing, that of one piston connecting the drainage receiving ports and that of the other, the pressure chamber, with the drainage discharge port, said by-passes being closed by the pistons under the action of the fluid pressure thereon.

Signed at Tacoma, Washington, this 25th day of January 1916.

CHARLES W. NEWCOMBE.

Copies of this patent may be obtained for five cents each, by addressing the "Commissioner of Patents, Washington, D. C."